United States Patent
Dauvergne

[11] 4,449,369
[45] May 22, 1984

[54] POWER ASSISTED HYDRAULIC CONTROL SYSTEM

[75] Inventor: Jean L. R. Dauvergne, Fosses, France

[73] Assignee: Valeo Societe Anonyme, Paris, France

[21] Appl. No.: 252,292

[22] Filed: Apr. 9, 1981

[30] Foreign Application Priority Data

Apr. 15, 1980 [FR] France ................. 80 08374

[51] Int. Cl.³ .......................... B60T 13/20
[52] U.S. Cl. ........................ 60/556; 60/563
[58] Field of Search ............ 60/550, 555, 556, 563, 60/565, 566; 91/460

[56] References Cited

U.S. PATENT DOCUMENTS

| | | | |
|---|---|---|---|
| 2,866,317 | 12/1953 | Stelzer . | |
| 2,913,877 | 11/1959 | Stelzer | 60/556 |
| 2,989,852 | 6/1961 | Rockwell | 91/460 |
| 3,050,944 | 8/1962 | Schwartz . | |
| 3,163,007 | 12/1964 | Scott | 60/566 |
| 3,727,986 | 4/1973 | Koivunen | 60/550 |
| 3,729,931 | 5/1973 | Shilten | 60/555 |
| 3,789,611 | 2/1974 | Marquardt | 60/566 |
| 3,798,905 | 3/1974 | Tennis | 60/563 |
| 4,312,182 | 1/1982 | Filderman | 60/556 |

Primary Examiner—Abraham Hershkovitz
Attorney, Agent, or Firm—Young & Thompson

[57] ABSTRACT

The invention provides a power assisted hydraulic control system suitable for actuating clutches and brakes. The system incorporates a master cylinder having a master piston therein defining a control chamber, a hydraulic power assistance unit, and a distributor adapted to connect, by means of a slide valve, the power assistance unit with the hydraulic receiver controlling the brake or clutch unit. The distributor comprises a slide-valve having a plunger one end of which is subjected to the pressure in the control chamber and the other end of which is subjected to the pressure in the receiver.

A bypass channel links the control chamber of the master cylinder to the pipeline connecting the operating port of the distributor to the receiver. The bypass channel has a bypass valve controlled by a spring which opens in the event of failure of the power assistance to permit manual operation by the master piston.

10 Claims, 3 Drawing Figures

POWER ASSISTED HYDRAULIC CONTROL SYSTEM

BACKGROUND OF THE INVENTION

The present invention relates to a power assisted hydraulic control system especially suitable for clutches and brakes, particularly of motor vehicles, comprising a master cylinder, and master piston mounted to slide in the master cylinder and delimiting a control chamber, a hydraulic assistance unit comprising fluid-pressure means and a reservoir, and a distributor having a pressure port, a return port and an operating port which are connected respectively to the fluid-pressure means, the reservoir and a receiver by conduits, the distributor comprising a slide-valve having a plunger one end of which is exposed to the pressure of said control chamber and the other end of which is exposed to the pressure of the receiver, said slide-valve plunger being adapted to put said receiver under pressure in response to the pressure generated by the master piston in the control chamber.

In assisted hydraulic control systems of this kind, safety means are generally provided to permit manual operation in case of failure of the power assistance. These safety means generally entail a more complicated construction and are not always satisfactory.

The object of the present invention is to provide an assisted hydraulic control system of the above kind, which is especially suitable for clutches and brakes, which is free of the disadvantages described, and which, with a simple and convenient construction, has excellent normal and manual stand-by operation.

SUMMARY

According to the invention, an assisted hydraulic control system of the kind described above has a bypass conduit which links the control chamber of the master cylinder to the conduit connecting the operating port of the distributor to the receiver, said bypass conduit having a calibrated valve which is subjected to two opposing pressures, one of which is the pressure of the receiver and the other of which is the pressure of the control chamber of the master cylinder, whereby this bypass valve remains closed during normal assisted operation and opens only in case of failure of the assistance, to permit manual operation.

By means of this arrangement, if the power assistance fails, the receiver is supplied directly by the movement of the master piston, which effectively guarantees the efficiency of the stand-by control.

According to another characteristic, a normally closed re-supply valve is interposed between the reservoir and the control chamber, and this valve when open permits the re-supply of the control chamber from the reservoir during the return of the master piston. By means of this arrangement, as long as the control chamber is under pressure, it is allowed to supply the receiver and, when it is depressurised, it is re-supplied by the reservoir via the above mentioned re-supply valve.

During normal operation, the stroke of the master piston is extremely reduced, since its only function is to displace slightly the slide-valve plunger of the distributor to bring the power assistance into operation. If the assistance fails, when the manual stand-by is applied, the stroke of the master piston becomes longer, since it is this stroke which ensures that the receiver is supplied by the bypass and its calibrated bypass valve.

An arrangement of this kind has, of course, the advantage of warning the driver when operation changes from a normal condition to an emergency condition. However, the extremely reduced stroke of the master piston during normal operation does not give the driver a sense of control comparable to that which can be obtained when the stroke is longer.

Consequently, according to one variant of the invention, means are provided to provide the master piston with a stroke which is just as long during normal operation as in the case of manual stand-by control.

According to this variant, the control chamber of the master cylinder is connected to a pressure accumulator which permits an extended stroke of the master piston both during normal power assisted operation and in case of failure of the assistance.

According to another characteristic, an additional valve is interposed between the control chamber and the accumulator and is adapted to close in the case of failure of the assistance, in such a way that, during manual operation, the receiver is supplied solely via the bypass, and not through the accumulator. Thus, the accumulator is used only during normal operation, and, during emergency manual operation, the stroke of the master piston is used solely to supply the receiver.

The present invention is applicable both to a system having a single receiver, which is generally the case for the control of clutches, and to a system having two receivers, which is commonly the case for brake control systems where two independent braking circuits are provided.

In the latter case, the master cylinder advantageously has a second control chamber which communicates with the first receiver and which is delimited by an auxiliary piston supplying the second receiver. If the circuit of the first receiver fails, the master piston is adapted to push the auxiliary piston mechanically, to ensure that the second receiver is supplied

DETAILED DESCRIPTION OF THE PREFERRED EMBODIMENTS

Figure 1:
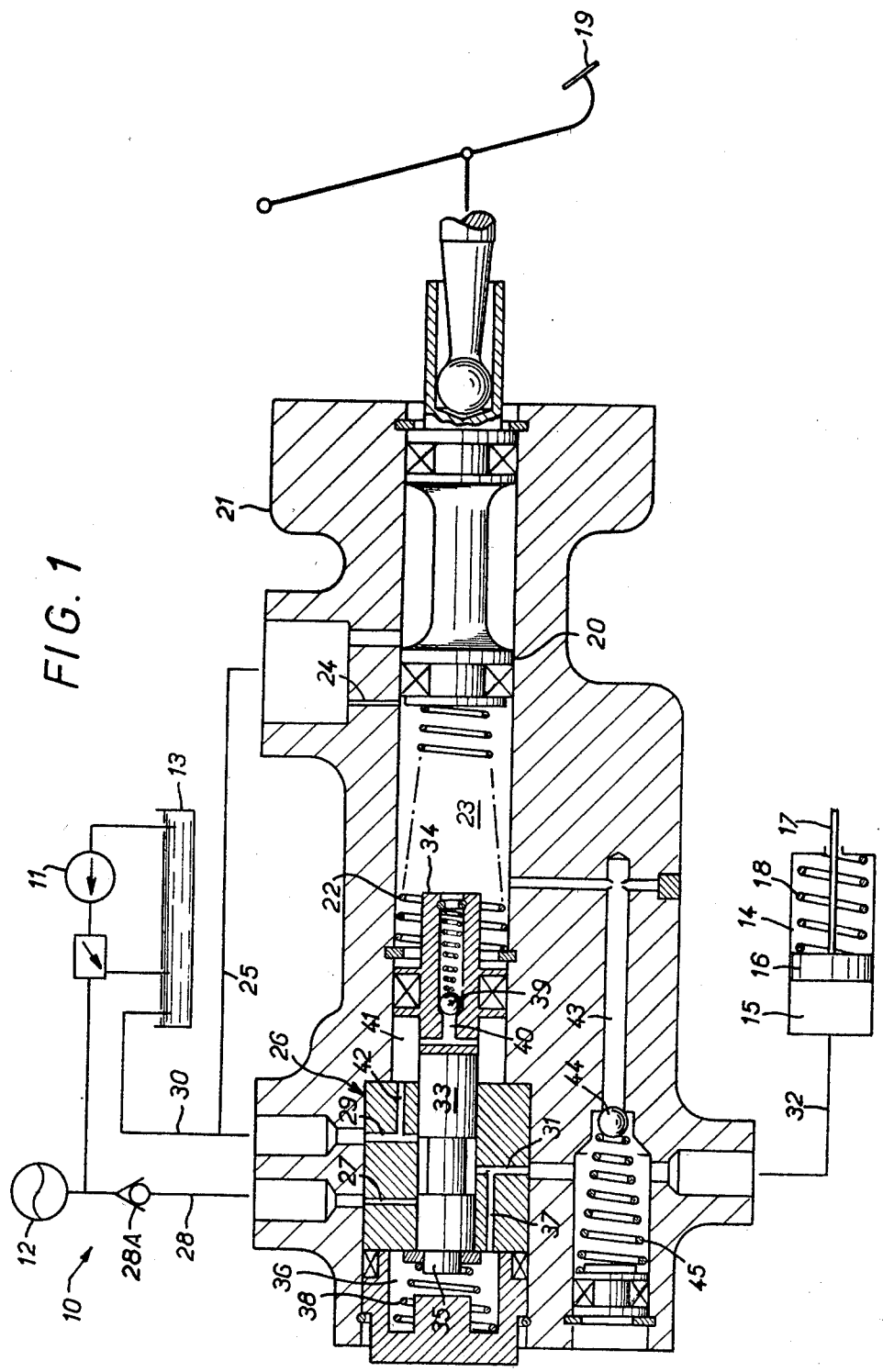
FIG. 1 shows a view in longitudinal section of a master cylinder of a power assisted hydraulic control system according to the invention, showing diagrammatically the circuits for the hydraulic assistance unit and the receiver.

FIG. 1, which relates by way of non-limiting example to the application of the invention to a power assisted hydraulic clutch control system for a motor vehicle, will be referred to first.

FIG. 1 shows at 10 a hydraulic assistance unit comprising fluid-pressure means such as a pump 11 and a hydropneumatic accumulator 12, and a reservoir 13. FIG. 1 also shows at 14 a receiver comprising a hydraulic chamber 15 defined by a piston 16 which is connected by a rod 17 to the clutch linkage (not shown).

FIG. 1 also shows at 18 a spring for returning the piston 16.

A clutch pedal 19 actuates a master piston 20 which is mounted to slide in a master cylinder 21 in which is located a spring 22 for returning the master piston to the rest position (illustrated in FIG. 1). The master piston 20 defines in the master cylinder 21 a control chamber 23 having an orifice 24. The orifice 24 causes the reservoir 13 to communicate via a pipeline 25 with the chamber 23 in the rest position of the master piston and is blocked by the master piston 20 as soon as the pedal 19 is actuated.

Thus, this control chamber 23 is allowed to be pressurised when the pedal 19 actuates the master piston 20.

A distributor, generally designated by 26, is located in the master cylinder 21 coaxially with the master piston 20.

This distributor 26 comprises: a pressure port 27 connected by a pipeline 28 having a non-return valve 28A, to the fluid-pressure means 11, 12; a return port 29 connected by a pipeline 30 to the reservoir 13; and an operating port 31 connected by a pipeline 32 to the chamber 15 of the receiver 14.

The distributor 26 has a slide-valve plunger 33 which interacts with the ports 27, 29 and 31, so as to put the operating port 31, depending on the position of said slide-valve plunger, either in communication with the return port 29 (position of rest shown) or in communication with the pressure port 27 (working position in which plunger 33 is offset slightly to the left relative to the preceding position) or else is an isolated condition, so as to maintain a constant pressure in the chamber 15. One end 34 of the slide-valve plunger 33 is exposed to the pressure of the control chamber 23, whilst the other end 35 of the slide-valve plunger 33 is exposed to the pressure of a chamber 36. The latter communicates permanently at 37 with the operating port 31 and is thus at the same pressure as the chamber 15 of the receiver 14. The slide-valve plunger 33 tends to be returned to the position of rest by a spring 38.

It will be understood that the slide-valve plunger 33 is designed to put the chamber 15 of the receiver 14 under pressure in response to the pressure generated by the master piston 20 in the control chamber 23.

In the vicinity of its end 34, the slide-valve plunger 33 is provided with a valve 39 which is normally closed and which is interposed between on the one hand, a passage 40 communicating at 41, 42, 29 and 30 with the reservoir 13 and, on the other hand, the control chamber 23. This valve 39 is designed to open to permit the re-supply of the control chamber 23 by the reservoir 13, during the return of the master piston 20.

A channel 43 is provided in the master cylinder 21 and forms a bypass conduit adapted to link the control chamber 23 to the pipeline 32, which connects the operating port 31 of the distributor 23 to the chamber 15 of the receiver 14.

This bypass channel 43 has a valve 44 controlled by a spring 45. This valve 44 is normally closed and is designed to open in the case of failure of the assistance, to permit manual operation for the purpose of supplying the chamber 15 of the receiver 14 directly by displacement of the master piston 20 under the action of the pedal 19.

As long as the driver does not press on the clutch pedal 19, the control system occupies the position of rest shown in FIG. 1, in which the master piston 20 is pushed back to the right of FIG. 1 by the spring 22, whilst the slide-valve plunger 33 likewise occupies a position on the right under the action of the spring 38. In this position, the slide valve plunger 33 causes the operating port 31 to communicate with the return port 29, whilst the pressure port 27 is isolated. The piston 16 of the receiver 14 is not under pressure. The clutch remains engaged.

When the driver presses on the clutch pedal 19, the master piston 20 first passes across the orifice 24 connected to the reservoir 13 and, once this is done, puts the control chamber 23 under pressure. Under the action of this pressure, the slide-valve plunger 33 moves to the left of FIG. 1, thus isolating the operating port 31 from the return port 29 and causing this operating port 31 to communicate with the pressure port 27. The pressure generated by the fluid-pressure means 12, 13 reaches the chamber 15 of the receiver 14 via 28, 27, 31 and 32. Under the action of this pressure, and also because of the spring 45, the valve 44 remains closed on its seat. The piston 16 of the receiver 14 is pushed back to the right of FIG. 1, thus effecting the disengagement of the clutch.

If the assistance fails, the fluid-pressure means 12, 13 no longer supply the pipeline 32 of the chamber 15 of the receiver 14. However, the effect of actuating the pedal 19 is to displace the master piston to the left of FIG. 1, and cause liquid to circulate in the bypass 43 by pushing back the calibrated valve 44, which allows the chamber 15 of the receiver 14 to be supplied, ensuring manual stand-by control. The non-return valve 28A prevents liquid under pressure from being driven back towards the unit 11, 12.

It will be understood that the valve 44 is subjected to two opposing pressures, one of which is that of the operating port 31 and the other that of the control chamber 33, so that it remains closed in normal assisted operation and opens only in case of failure of the assistance, to permit manual operation.

The simple and convenient construction of the control system according to the invention, and likewise its particularly efficient operation both under normal conditions and in the event of failure of the power assistance, will be understood.

It will also be understood that the valve 39 enables the chamber 23 to be re-supplied during the return of the piston 19.

In the embodiment which has just been described with reference to FIG. 1, the travel of the clutch pedal 19 is reduced during normal operation, since its only effect is to displace the slide-valve plunger 33, the stroke of which is extremely reduced. On the other hand, the travel of the pedal 19 is extended, during manual operation, by the necessity for direct supply of the chamber 15 of the receiver 14, if the assistance fails.

Figure 2:
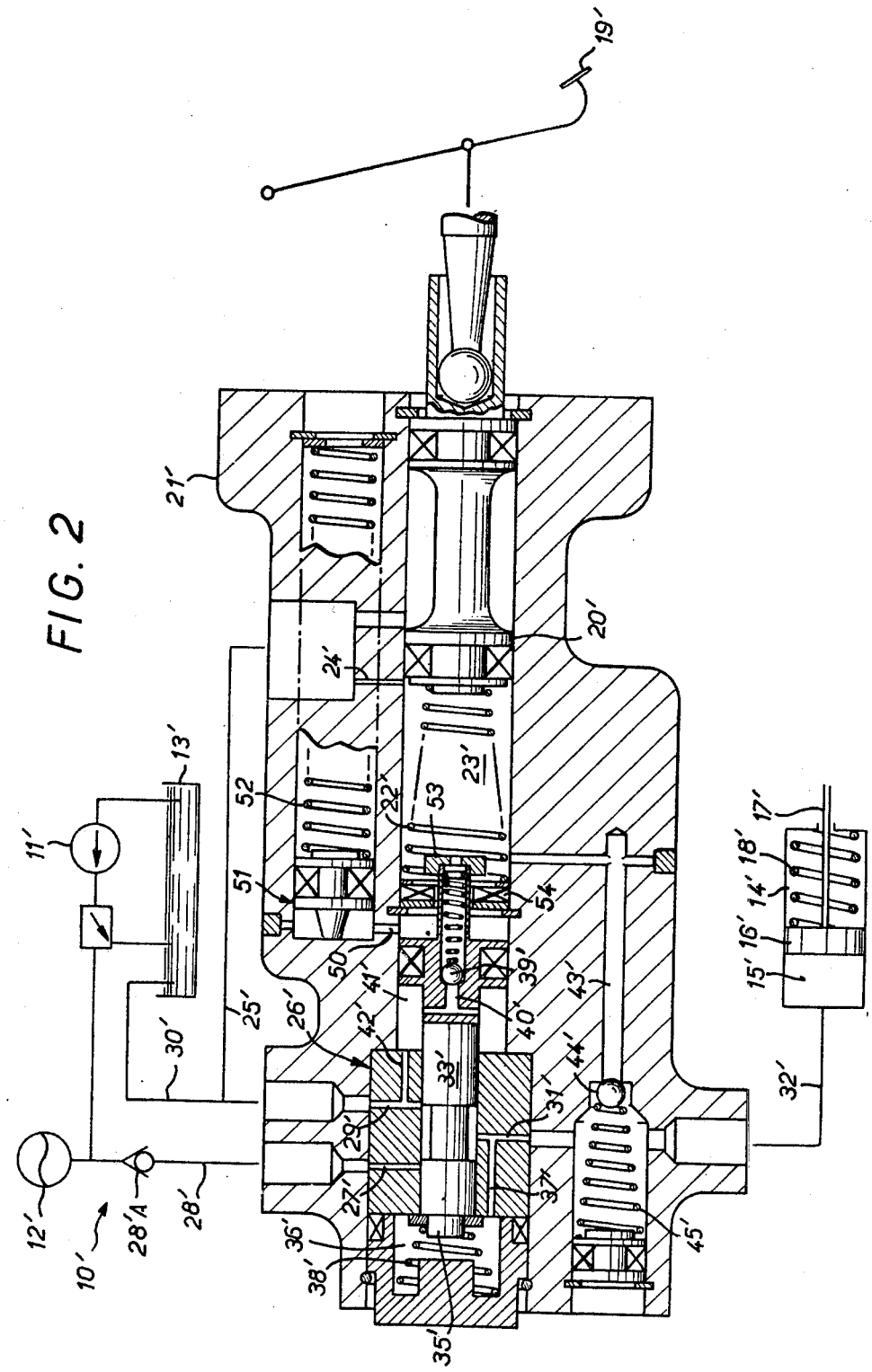
FIG. 2 shows, in a view similar to FIG. 1, a second embodiment of the invention in which the master cylinder also possesses an accumulator to permit an extended stroke of the master piston during normal operation.

FIG. 2, in which the arrangement is similar to that which has just been described with reference to FIG. 1, but in which means are provided to give the pedal 19 an extended travel, both during normal operation and in the case of emergency manual operation, will now be referred to. In FIG. 2, the reference numerals of FIG. 1 have been adopted to designate analogous elements, but are followed by a prime.

In the construction according to FIG. 2, the control chamber 23' of the master cylinder 21' is connected by a channel 50 to a pressure accumulator 51 of the type having a spring 52. In the embodiment according to FIG. 2, this pressure accumulator 51 is located parallel to the axis of the master piston 20' and the slide-valve plunger 33'.

A valve 53 is interposed between the control chamber 23' and the accumulator 51 and is allowed to close against a seat 54 in case of failure of the power assistance, so that the manual operation of the piston 20' is reserved for supplying the receiver 14' via the bypass 43' and is thus freed from any charging of the accumulator 51.

The normal operation is similar to that described with reference to FIG. 1, but, here, the stroke of the master piston 20' is extended because the control chamber 23' is supplying and charging the accumulator 51. This more extended stroke of the master piston 19' gives the driver a sense of complete control of the operation.

Functioning in case of failure of the assistance is also similar to that described with reference to FIG. 1. The valve 53 closes and the master piston 20' no longer charges the accumulator 51, so that the intervention of the master piston 20' serves solely to actuate the receiver 14'.

In another variant (FIG. 3), the arrangement is again similar to that described with reference to FIG. 1 or to FIG. 2, but here the assisted hydraulic control supplies two receivers, designated by 14"A and 14"B respectively. Moreover, the control is illustrated as being applied, more particularly, to the brakes of a motor vehicle having two independent braking circuits associated with the receivers 14"A and 14"B. The same reference numerals have been adopted in FIG. 3 to designate elements corresponding to those described previously and are followed by two primes.

Figure 3:
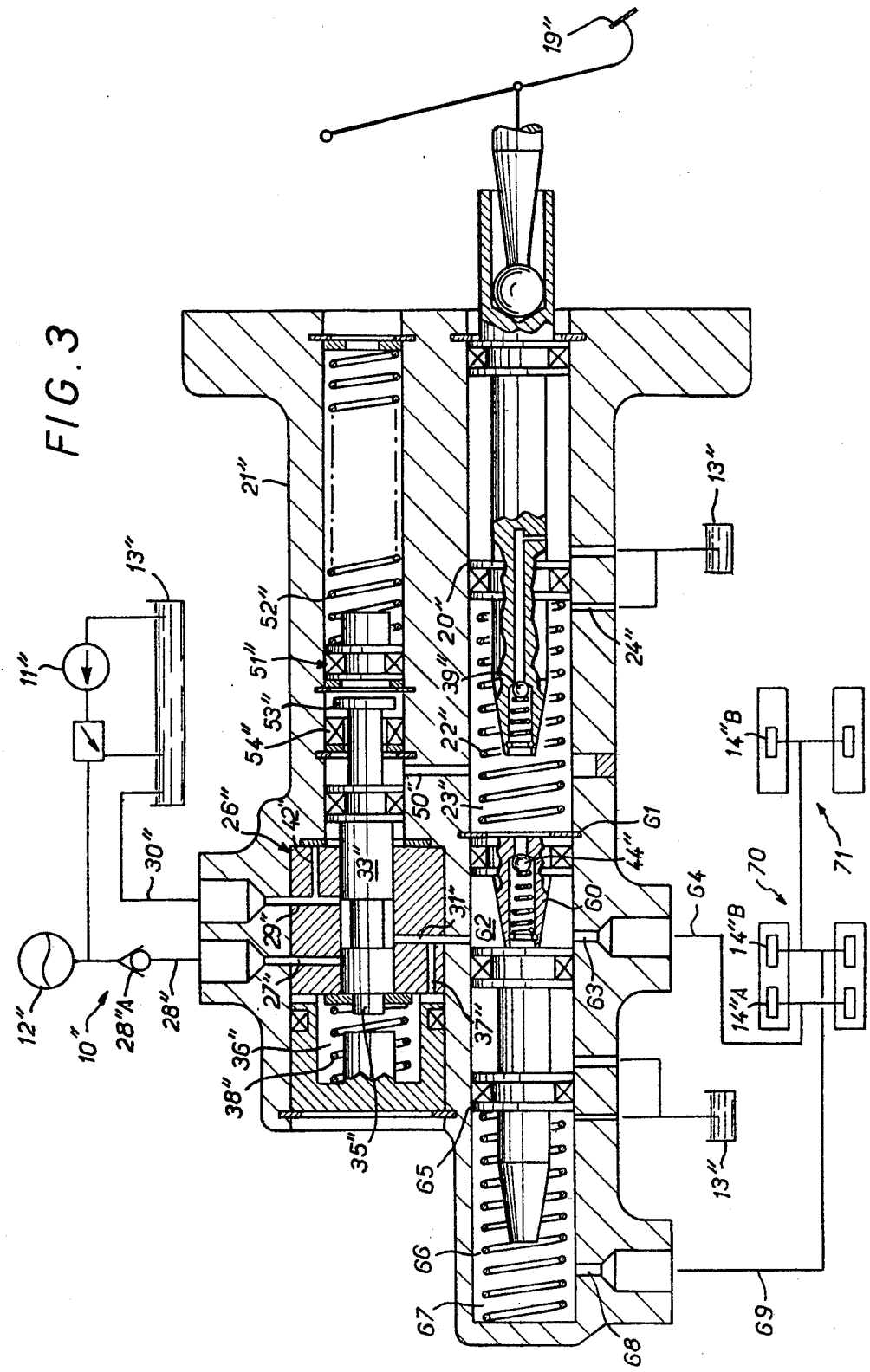
FIG. 3 shows another variant, having two independent receiver circuits.

FIG. 3 shows at 44" the calibrated bypass valve, at 39" the valve for re-supplying the control chamber 23" and at 53" the valve associated with the accumulator 51". The re-supply valve 39" is carried coaxially by the master piston 20". The accumulator 51" is coaxial with the slide-valve plunger 33". Here, the calibrated bypass valve 44" is located coaxially with the master piston 20" and is mounted in a movable part 60 which normally bears against a stop 61 and is adapted to be displaced directly by the master piston 20" in case of failure of the pressure in the chamber 23". Slide-valve plunger 33" is located parallel to the master piston 20".

As will be seen from FIG. 3, the master cylinder 21" has a second control chamber 62 communicating at 63 via a pipeline 64 with the first receiver 14"A. The chamber 62 is defined by an auxiliary piston 65 which has a returning spring 66 and is associated with a chamber 67. The latter communicates at 68 via a pipeline 69 with the second receiver 14"B.

In the embodiment illustrated in FIG. 3, the motor vehicle has two front wheels 70 and two rear wheels 71. The front wheels 70 possess wheel cylinders having receivers 14"A and 14"B for braking the front axle whilst the rear wheels 71 possess wheel cylinders having receivers 14"B for braking the rear axle.

As long as the driver does not press on the brake pedal 19", the master piston 20" and the auxiliary piston 65 are pushed back to the right by the springs 22" and 66. The various receivers 14"A and 14"B are in communication with the reservoir 13".

When the driver presses on the pedal 19" in order to brake, the chambers 23", 62 and 67 are pressurised, thus supplying the receivers 14"A and 11"B and ensuring power assisted braking.

If the power assistance fails, the displacement of the master piston 20" pressurises the chambers 62 and 67, by opening the bypass valve 44" and, consequently, the receivers 14"A and 14"B, ensuring emergency braking.

It will be understood that at least partial braking is still ensured if one of the two circuits 64 and 69 fails.

In case of failure of the circuit 64, the master piston 20" pushes directly on the movable part 60 which in turn, pushes on the auxiliary piston 65, thus ensuring that the circuit 69 is supplied.

If it is the circuit 69 which fails, braking remains guaranteed by the circuit 64.

I claim:

1. A power assisted hydraulic control system, comprising a master cylinder, a master piston mounted for sliding in the master cylinder and defining a control chamber, a hydraulic assistance unit including fluid-pressure means and a reservoir, a distributor having a slide-valve plunger one end of which is subjected to the pressure in said control chamber and the other end of which is subjected to the pressure in a receiver, said slide-valve plunger being adapted to place the receiver under pressure in response to pressure generated by the master piston in the control chamber, said slide-valve plunger and said master piston being disposed on opposite sides of said control chamber, a bypass channel connecting the control chamber of the master cylinder to a conduit connecting the distributor to the receiver, and a bypass valve controlling fluid flow through said bypass channel, said bypass valve being operated in response to two opposing pressures, one of which is the pressure in said receiver and the other of which is the pressure in the control chamber, whereby said bypass valve normally remains closed and opens only in case of failure of the power assistance, to permit manual emergency operation.

2. A hydraulic control system according to claim 1, wherein the bypass valve is biassed by a spring into the closed position.

3. A hydraulic control system according to claim 1, wherein said distributor has a pressure port, a return port, and an operating port, which are connected respectively by conduits to the fluid-pressure means, the reservoir, and the receiver, and the bypass valve is interposed between said operating port and said control chamber.

4. A hydraulic control system according to claim 1, wherein the bypass valve is located parallel to the master piston and the slide-valve plunger, and the master piston and the slide-valve are coaxial.

5. A hydraulic control system according to claim 1, wherein a normally closed re-supply valve is interposed between the reservoir and the control chamber operable to permit the re-supply of the control chamber by the reservoir during the return of the master piston.

6. A hydraulic control system according to claim 5, wherein the re-supply valve is coaxial with the slide-valve plunger.

7. A hydraulic control system according to claim 5, wherein the re-supply valve is coaxial with the master piston.

8. A hydraulic control system according to claim 1, wherein the control chamber of the master cylinder is connected to a pressure accumulator operable to permit an extended stroke of the master piston, both during normal assisted operation and in the case of failure of the power assistance.

9. A hydraulic control system according to claim 8, wherein the accumulator is located parallel to the slide-valve plunger.

10. A hydraulic control system according to claim 1, wherein a non-return valve is provided between the fluid-pressure means of the hydraulic unit and the pressure port of the distributor.

* * * * *